(12) United States Patent
    Son et al.

(10) Patent No.: US 12,586,820 B2
(45) Date of Patent: Mar. 24, 2026

(54) ELECTROLYTE FOR LITHIUM SECONDARY BATTERIES COMPRISING IONIC LIQUID AND COSOLVENT AND LITHIUM SECONDARY BATTERY COMPRISING THE SAME

(71) Applicants: HYUNDAI MOTOR COMPANY, Seoul (KR); KIA CORPORATION, Seoul (KR); Hanbat National University Industry-Academic Cooperation Foundation, Daejeon (KR)

(72) Inventors: Sam Ick Son, Suwon-si (KR); Sun Yul Ryou, Daejeon (KR); Phiri Isheunesu, Daejeon (KR); Hyeong Su Bae, Daejeon (KR)

(73) Assignees: Hyundai Motor Company, Seoul (KR); Kia Corporation, Seoul (KR); Hanbat National University Industry-Academic Cooperation Foundation, Daejeon (KR)

( * ) Notice: Subject to any disclaimer, the term of this patent is extended or adjusted under 35 U.S.C. 154(b) by 614 days.

(21) Appl. No.: 18/082,802

(22) Filed: Dec. 16, 2022

(65) Prior Publication Data

US 2024/0047754 A1     Feb. 8, 2024

(30) Foreign Application Priority Data

Aug. 8, 2022     (KR) ........................ 10-2022-0098751

(51) Int. Cl.
    *H01M 10/00*     (2006.01)
    *H01M 4/40*      (2006.01)
    (Continued)

(52) U.S. Cl.
    CPC ....... *H01M 10/0569* (2013.01); *H01M 4/405* (2013.01); *H01M 10/052* (2013.01);
    (Continued)

(58) Field of Classification Search
    CPC ......... H01M 10/0569; H01M 10/0568; H01M 10/0567; H01M 4/40; H01M 50/46; H01M 10/052
    See application file for complete search history.

(56) References Cited

U.S. PATENT DOCUMENTS

| | | | |
|---|---|---|---|
| 2010/0304225 A1 | 12/2010 | Pascaly et al. | |
| 2018/0048025 A1* | 2/2018 | Jilek | .................. H01M 10/052 |
| 2021/0075062 A1 | 3/2021 | Yang et al. | |

FOREIGN PATENT DOCUMENTS

| | | | |
|---|---|---|---|
| JP | 2017050465 A | * | 3/2017 |
| KR | 10-2010-0051771 A | | 5/2010 |
| | (Continued) | | |

OTHER PUBLICATIONS

Hattori et al., Electrode for Power Storage Device, Power Storage Device, and Method for Manufacturing Electrode for Power Storage Device, Mar. 2017. see the Abstract (Year: 2017).*

(Continued)

*Primary Examiner* — Tiffany Legette
*Assistant Examiner* — Monique M Wills
(74) *Attorney, Agent, or Firm* — Morgan Lewis & Bockius LLP

(57)     ABSTRACT

An electrolyte for lithium secondary batteries includes an ionic liquid and cosolvents and a lithium secondary battery includes the same. The electrolyte includes a mixed solvent including the ionic liquid and the cosolvents, and at least one electrolyte salt, the cosolvents include a carbonate-based solvent and a nitrile-based solvent, and the mixed solvent includes 50-80 vol % of the ionic liquid, 15-45 vol % of the (Continued)

carbonate-based solvent, and 5-10 vol % of the nitrile-based solvent.

15 Claims, 10 Drawing Sheets

(51) Int. Cl.

| | | |
|---|---|---|
| *H01M 10/052* | (2010.01) | |
| *H01M 10/0567* | (2010.01) | |
| *H01M 10/0568* | (2010.01) | |
| *H01M 10/0569* | (2010.01) | |
| *H01M 50/46* | (2021.01) | |
| *H01M 4/02* | (2006.01) | |

(52) U.S. Cl.
CPC ... *H01M 10/0567* (2013.01); *H01M 10/0568* (2013.01); *H01M 50/46* (2021.01); *H01M 2004/027* (2013.01); *H01M 2300/0037* (2013.01); *H01M 2300/0051* (2013.01)

(56) References Cited

FOREIGN PATENT DOCUMENTS

| KR | 10-2014-0046364 A | 4/2014 |
|---|---|---|
| KR | 10-2016-0037794 A | 4/2016 |
| KR | 10-2017-0039580 A | 4/2017 |
| KR | 10-2017-0052906 A | 5/2017 |
| KR | 10-2018-0021516 A | 3/2018 |
| KR | 10-2019-0033453 A | 3/2019 |
| KR | 10-2021-0026499 A | 3/2021 |

OTHER PUBLICATIONS

G. Girishkumar, et al., "Lithium—Air Battery: Promise and Challenges," The Journal of Physical Chemistry Letters, No. 1, 2010, pp. 2193-2203.

* cited by examiner

1M LiTFSI

1M LiTFSI(15 vol% PC + 5 vol% ACN)

1M LiTFSI + 0.05M LiBOB + 0.05M LiNO₃ (15 vol% PC + 5 vol% ACN)

0.8M LiTFSI + 0.2M LiBOB (15 vol% PC + 5 vol% ACN)

0.6M LiBOB (45 vol% PC + 5 vol% ACN)

0.6M LiBOB + 0.05M LiNO₃ (45 vol% PC + 5 vol% ACN)

0.6M LiTFSI + 0.4M LiBOB (35 vol% PC + 5 vol% ACN)

0.6M LiTFSI + 0.4M LiBOB + 0.05M LiNO₃ (35 vol% PC + 5 vol% ACN)

ELECTROLYTE FOR LITHIUM SECONDARY BATTERIES COMPRISING IONIC LIQUID AND COSOLVENT AND LITHIUM SECONDARY BATTERY COMPRISING THE SAME

CROSS-REFERENCE TO RELATED APPLICATION

The present application claims priority to Korean Patent Application No. 10-2022-0098751 filed on Aug. 8, 2022, the entire contents of which is incorporated herein for all purposes by this reference.

BACKGROUND OF THE PRESENT DISCLOSURE

Field of the Present Disclosure

The present disclosure relates to an electrolyte for lithium secondary batteries including an ionic liquid and cosolvents and a lithium secondary battery including the same.

Description of Related Art

Secondary batteries which are rechargeable are widely used in small electronic devices, such as a cellular phone and a notebook computer, and in large vehicles, such as a hybrid vehicle and an electric vehicle. Accordingly, the need for high-capacity secondary batteries is being increased. Lithium metal has a high theoretical capacity and a very low oxidation-reduction potential, and is spotlighted as an anode material for high-capacity and high-energy density lithium secondary batteries.

Furthermore, ionic liquids exist in a liquid state without crystallization due to imbalance between the amounts of cations and anions. The ionic liquids have low volatility, thermal stability and electrochemical stability and non-flammable properties, and thus, research on use of the ionic liquids as solvents of liquid electrolytes for batteries is being carried out. However, the ionic liquids have low lithium ion conductivity due to the high viscosity thereof.

The information disclosed in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an electrolyte for lithium secondary batteries which uses an ionic liquid-based solvent rather than an organic solvent so as to have high ion conductivity while having electrochemical stability and non-flammable properties, and a lithium secondary battery including the same.

It is another object of the present disclosure to provide an electrolyte for lithium secondary batteries which may improve the lifespan of a battery.

In one aspect, the present disclosure provides an electrolyte for lithium secondary batteries including a mixed solvent including an ionic liquid and cosolvents, and at least one electrolyte salt, wherein the cosolvents includes a carbonate-based solvent and a nitrile-based solvent, wherein the mixed solvent includes 50-80 vol % of the ionic liquid, 5-45 vol % of the carbonate-based solvent, and 5-10 vol % of the nitrile-based solvent.

In an exemplary embodiment of the present disclosure, the ionic liquid may include at least one selected from the group consisting of 1-ethyl-3-methylimidazolium bis(trifluoromethylsulfonyl)imide (EMI-TFSI), 1-methyl-3-propylpiperidinium bis(trifluoromethanesulfonyl)imide (P13-TFSI), 1-butyl 1-methylpiperidinium bis(trifluoromethylsulfonyl)imide (P14-TFSI), and combinations thereof.

In another exemplary embodiment of the present disclosure, a mixing ratio of the nitrile-based solvent to the carbonate-based solvent may be 1:3 to 1:9.

In yet another exemplary embodiment of the present disclosure, the carbonate-based solvent may include propylene carbonate (PC), and the nitrile-based solvent may include acetonitrile (ACN).

In yet another exemplary embodiment of the present disclosure, the at least one electrolyte salt may include at least two electrolyte salts.

In still yet another exemplary embodiment of the present disclosure, a concentration of the at least one electrolyte salt may be 0.5-1.5 M.

In a further exemplary embodiment of the present disclosure, the at least one electrolyte salt may include at least one lithium salt, and the at least one lithium salt may include at least two selected from the group consisting of LiTFSI, LiBOB, LiFSI, LiPF$_6$, and combinations thereof.

In another further exemplary embodiment of the present disclosure, the at least one electrolyte salt may include at least one lithium salt and a salt additive, the at least one lithium salt may include at least one selected from the group consisting of LiTFSI, LiBOB, LiFSI, LiPF$_6$, and combinations thereof, and the salt additive may include LiNO$_3$.

In yet another further exemplary embodiment of the present disclosure, a concentration of the at least one lithium salt may be 0.5-1.5 M, and a concentration of the salt additive may be 0.01-0.1 M.

In yet another further exemplary embodiment of the present disclosure, the ionic liquid may include 1-ethyl-3-methylimidazolium bis(trifluoromethylsulfonyl)imide (EMI-TFSI), the carbonate-based solvent may include propylene carbonate (PC), the nitrile-based solvent may include acetonitrile (ACN), the at least one electrolyte salt may include at least one lithium salt, and the least one lithium salt may include 0.6-1.0 M LiTFSI and 0.2-0.4 M LiBOB.

In still yet another further exemplary embodiment of the present disclosure, the ionic liquid may include 1-ethyl-3-methylimidazolium bis(trifluoromethylsulfonyl)imide (EMI-TFSI), the carbonate-based solvent may include propylene carbonate (PC), the nitrile-based solvent may include acetonitrile (ACN), the at least one electrolyte salt may include at least one lithium salt and a salt additive, the at least one lithium salt may include 0.5-1.5 M LiBOB, and the salt additive may include 0.01-0.1 M LiNO$_3$.

In a still further exemplary embodiment of the present disclosure, the ionic liquid may include 1-ethyl-3-methylimidazolium bis(trifluoromethylsulfonyl)imide (EMI-TFSI), the carbonate-based solvent may include propylene carbonate (PC), the nitrile-based solvent may include acetonitrile (ACN), the at least one electrolyte salt may include at least one lithium salt and a salt additive, the at least one lithium salt may include 0.4-1.0 M LiBOB, and the salt additive may include 0.01-0.1 M LiNO$_3$.

In a yet still further exemplary embodiment of the present disclosure, the ionic liquid may include 1-butyl 1-methylpiperidinium bis(trifluoromethylsulfonyl)imide (P14-TFSI), the carbonate-based solvent may include propylene carbonate (PC), the nitrile-based solvent may include acetonitrile (ACN), the at least one electrolyte salt may include at least one lithium salt and a salt additive, the at least one lithium salt may include 0.3-1.0 M LiTFSI and 0.2-0.6 M LiBOB, and the salt additive may include 0.01-0.1 M $LiNO_3$.

In another exemplary embodiment of the present disclosure, the electrolyte may be configured to have an ion conductivity of $7.4 \times 10^{-3}$ S/cm or more and an activation energy of $9.9 \times 10^{-5}$ eV or less at a temperature of 25° C.

In another aspect, the present disclosure provides a lithium secondary battery including a cathode, an anode including lithium metal, and a separator located between the cathode and the anode, wherein the lithium secondary battery is impregnated with the above-described electrolyte.

The present invention has other features and advantages which will be apparent from or are set forth in more detail in the accompanying drawings, which are incorporated herein, and the following Detailed Description, which together serve to explain certain principles of the present invention.

Other aspects and exemplary embodiments of the present disclosure are discussed infra.

The above and other features of the present disclosure are discussed infra.

BRIEF DESCRIPTION OF THE DRAWINGS

The above and other features of the present disclosure will now be described of illustration only, and thus are not limitative of the present disclosure, and wherein.

Figure 1:
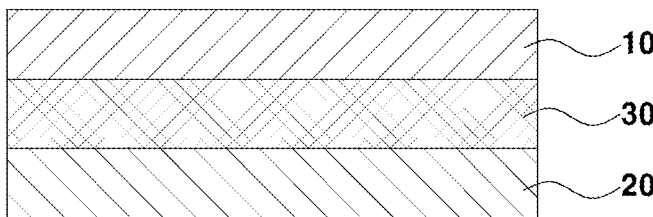
FIG. 1 shows a longitudinal-sectional view of a lithium secondary battery according to an exemplary embodiment of the present disclosure.

It should be understood that the appended drawings are not necessarily to scale, presenting a somewhat simplified representation of various preferred features illustrative of the basic principles of the present disclosure. The specific design features of the present disclosure as disclosed herein, including, for example, specific dimensions, orientations, locations, and shapes, will be determined in part by the particular intended application and use environment.

In the figures, reference numbers refer to the same or equivalent parts of the present disclosure throughout the several figures of the drawings.

DETAILED DESCRIPTION

Reference will now be made in detail to various embodiments of the present invention(s), examples of which are illustrated in the accompanying drawings and described below. While the present disclosure(s) will be described in conjunction with exemplary embodiments, it will be understood that the present description is not intended to limit the present disclosure(s) to those exemplary embodiments. On the contrary, the present disclosure(s) is/are intended to cover not only the exemplary embodiments, but also various alternatives, modifications, equivalents and other embodiments, which may be included within the spirit and scope of the present disclosure as defined by the appended claims.

The above-described objects, other objects, advantages and features of the present disclosure will become apparent from the descriptions of embodiments given hereinbelow with reference to the accompanying drawings. However, the present disclosure is not limited to the embodiments disclosed herein and may be implemented in various different forms. The embodiments are provided to make the description of the present disclosure thorough and to fully convey the scope of the present disclosure to those skilled in the art.

In the following description of the embodiments, the same elements are denoted by the same reference numerals even when they are depicted in different drawings. In the drawings, the dimensions of structures may be exaggerated compared to the actual dimensions thereof, for clarity of description. In the following description of the embodiments, terms, such as "first" and "second", may be used to describe various elements but do not limit the elements. These terms are used only to distinguish one element from other elements. For example, a first element may be named a second element, and similarly, a second element may be named a first element, without departing from the scope and spirit of the present disclosure. Singular expressions may encompass plural expressions, unless they have clearly different contextual meanings.

In the following description of the embodiments, terms, such as "including", "comprising" and "having", are to be interpreted as indicating the presence of characteristics, numbers, steps, operations, elements or parts stated in the description or combinations thereof, and do not exclude the presence of one or more other characteristics, numbers, steps, operations, elements, parts or combinations thereof, or possibility of adding the same. In addition, it will be understood that, when a part, such as a layer, a film, a region or a plate, is said to be "on" another part, the part may be located "directly on" the other part or other parts may be interposed between the two parts. In the same manner, it will be understood that, when a part, such as a layer, a film, a region or a plate, is said to be "under" another part, the part may be located "directly under" the other part or other parts may be interposed between the two parts.

All numbers, values and/or expressions representing amounts of components, reaction conditions, polymer compositions and blends used in the description are approximations in which various uncertainties in measurement generated when these values are acquired from essentially different things are reflected and thus it will be understood that they are modified by the term "about", unless stated otherwise. In addition, it will be understood that, if a numerical range is disclosed in the description, such a range includes all continuous values from a minimum value to a maximum value of the range, unless stated otherwise. Furthermore, if such a range refers to integers, the range includes all integers from a minimum integer to a maximum integer, unless stated otherwise.

Respective elements of a lithium secondary battery according to an exemplary embodiment of the present disclosure will be described below in detail.

FIG. 1 shows a longitudinal-sectional view of the lithium secondary battery according to an exemplary embodiment of the present disclosure. Referring to this figure, the lithium secondary battery may include a cathode 10, an anode 20, and a separator 30 located between the cathode 10 and the anode 20. The lithium secondary battery may be impregnated with an electrolyte (not shown).

The cathode 10 may include a cathode active material, a binder, a conductive material, etc.

The cathode active material may include at least one selected from the group consisting of lithium cobalt oxide, lithium nickel cobalt manganese oxides, lithium nickel cobalt aluminum oxides, lithium iron phosphate, lithium manganese oxide and combinations thereof. However, the cathode active material is not limited thereto, and may employ any cathode active material, which is usable in the art to which the present disclosure pertains.

The binder is a material which assists binding between the cathode active material and the conductive material and binding with a current collector, may include at least one selected from the group consisting of poly(vinylidene fluoride), polyvinyl alcohol, carboxymethyl cellulose (CMC), starch, hydroxypropyl cellulose, regenerated cellulose, polyvinyl pyrrolidone, tetrafluoroethylene, polyethylene, polypropylene, ethylene propylene diene terpolymer (EPDM), sulfonated EPDM, styrene butadiene rubber (SBR), fluorine rubber, and various copolymers.

The conductive material may include any material which is conductive while not causing chemical change of the corresponding battery, without being limited thereto, and, for example, may include at least one selected from the group consisting of graphite, such as natural graphite or artificial graphite, a carbon-based material, such as carbon black, acetylene black, Ketjen black, channel black, furnace black, lamp black or summer black, conductive fiber, such as carbon fiber or metal fiber, metal powder, such as fluorinated carbon, aluminum or nickel powder, a conductive metal oxide, such as titanium oxide, and a conductive material, such as a polyphenylene derivative.

The anode 20 may include lithium metal or a lithium metal alloy.

The lithium metal alloy may include an alloy of lithium and a metal or a metalloid alloyable with lithium. The metal or the metalloid alloyable with lithium may include Si, Sn, Al, Ge, Pb, Bi or Sb. The lithium metal has a high electric capacity per unit weight, and is advantageous in implementation of a high capacity battery.

The separator 30 serves to prevent contact between the cathode 10 and the anode 20. The separator 30 may include any material which is generally used in the art to which the present disclosure pertains, without being limited thereto, and, for example, may include a polyolefin-based material, such as polypropylene (PP) or polyethylene (PE).

The present disclosure relates to an electrolyte for lithium secondary batteries, and the electrolyte for lithium secondary batteries according to an exemplary embodiment of the present disclosure may include a mixed solvent including an ionic liquid and cosolvents, and at least one electrolyte salt.

Respective components of the electrolyte for lithium secondary batteries according to an exemplary embodiment of the present disclosure will be described in more detail below.

Mixed Solvent

The mixed solvent includes the ionic liquid and the cosolvents.

In the ionic liquid, crystals are formed by cations, i.e., positively-charged ions, and anions, i.e., negatively-charged ions, due to electrostatic force by which the cations and the anions pull each other.

The ionic liquid has low volatility and flammability, and is thus spotlighted as a material which may increase stability of batteries. The ionic liquid may employ any conventional ionic liquid which has lithium ion conductivity and is thus used as an electrolyte for lithium batteries, without being limited thereto.

The ionic liquid is not limited to a material including a specific component, and may be, for example, one selected from the group consisting of 1-ethyl-3-methylimidazolium (EMIM), 1-butyl-3-methylimidazolium, (BMIM), 1,3-dimethylimidazolium (MMIM), N-butyl-N-methylpyrrolidinium (PYR14), trimethyl-propyl-ammonium (N1113) butyl-trimethyl-ammonium (N1114), N-methyl-N-butyl-piperidinium (PP14), N-propyl-N-methylpyrrolidinium (PYR13), chloride (Cl), dicyanamide (DCA), trifluoromethanesulfonate (Otf), bis(trifluoromethylsulfonyl)imide (TFSI), acetate (Ac), hydrates (OH), diethylphosphate (DEP), thiocyanate (SCN), methyl sulfate (MeSO$_4$), bis(fluorosulfonyl)imide (FSI), and combinations thereof.

Concretely, the ionic liquid may use at least one selected from the group consisting of 1-ethyl-3-methylimidazolium bis(trifluoromethylsulfonyl)imide (EMI-TFSI), 1-methyl-3-propylpiperidinium bis(trifluoromethanesulfonyl)imide (P13-TFSI), 1-butyl 1-methylpiperidinium bis(trifluoromethylsulfonyl)imide (P14-TFSI), and combinations thereof, which have high ionic conductivity and excellent high-potential stability.

The mixed solvent may use at least two cosolvents. The cosolvents may include a carbonate-based solvent and a nitrile-based solvent. In the present disclosure, "the cosolvents" indicate secondary solvents which are added in a designated amount so as to increase solvent power of a primary solvent. Here, in the present disclosure, the primary solvent indicates the ionic liquid.

In the present disclosure, the mixed solvent may be a mixture of 50-80 vol % of the ionic liquid, 15-45 vol % of the carbonate-based solvent and 5-10 vol % of the nitrile-based solvent.

Furthermore, the mixing volume ratio of the nitrile-based solvent to the carbonate-based solvent used as the cosolvents according to an exemplary embodiment of the present disclosure may be 1:3 to 1:9.

Cyclic carbonate having relatively high permittivity and viscosity may be used as the carbonate-based solvent.

The nitrile-based solvent may have lower viscosity than the cyclic carbonate, and may have higher permittivity than linear carbonate. The cyclic carbonate is in a solid state or has very high viscosity at room temperature, and thus, it is difficult to use the cyclic carbonate alone as a solvent which dissolves an electrolyte. Therefore, the mixed solution including the cyclic carbonate and a solvent having relatively low viscosity is used, and the linear carbonate used at this time has remarkably low permittivity and may thus degrade the performance of an electrolyte composite. Therefore, when the nitrile-based solvent having high permittivity but remarkably low viscosity is used instead of the linear carbonate, the electrolyte may be effectively dissolved and the function of the electrolyte may not be degraded. Any one of acetonitrile and propionitrile may be used as the nitrile-based solvent.

The carbonate-based solvent may include at least one selected from the group consisting of ethylene carbonate (EC), ethyl methyl carbonate (EMC), dimethyl carbonate (DMC), diethyl carbonate (DEC), propylene carbonate (PC), vinyl ethylene carbonate (VEC), fluoroethylene carbonate (FEC), and combinations thereof.

Concretely, in an exemplary embodiment of the present disclosure, propylene carbonate (PC) may be used as the carbonate-based solvent, and acetonitrile (ACN) may be used as the nitrile-based solvent.

Electrolyte Salt

The electrolyte may include at least one electrolyte salt. The electrolyte may include the at least one electrolyte salt in an concentration of 0.5-1.5 M.

Concretely, the at least one electrolyte salt may include a lithium salt, and more particularly, may include at least two lithium salts.

The lithium salts may serve as a lithium ion source in the battery, and may be any salts which may promote migration of lithium ions between the cathode and a polymer electrolyte membrane, without being limited thereto.

Concretely, the at least one electrolyte salt may include at least two selected from the group consisting of lithium bis(trifluoromethanesulfonyl)imide (LiTFSI), lithium bis (oxalate)borate (LiBOB), lithium bis(fluorosulfonyl)imide (LiFSI), lithium hexafluorophosphate (LiPF$_6$), and combinations thereof.

In an electrolyte according to another exemplary embodiment of the present disclosure, the at least one electrolyte salt may further include a salt additive in addition to at least one lithium salt. The at least one lithium salt may include at least one selected from the group consisting of LiTFSI, LiBOB, LiFSI, LiPF$_6$, and combinations thereof, and the salt additive may include LiNO$_3$. Here, the concentration of the salt additive may be 0.01-0.1 M.

Concretely, an electrolyte according to an exemplary embodiment of the present disclosure may use 1-ethyl-3-methylimidazolium bis(trifluoromethylsulfonyl)imide (EMI-TFSI) as the ionic liquid, may use propylene carbonate (PC) as the carbonate-based solvent, may use acetonitrile (ACN) as the nitrile-based solvent, the at least one electrolyte salt may include lithium salts, and 0.6-1.0 M LiTFSI and 0.2-0.4 M LiBOB may be used as the lithium salts.

Concretely, an electrolyte according to another exemplary embodiment of the present disclosure may use 1-ethyl-3-methylimidazolium bis(trifluoromethylsulfonyl)imide (EMI-TFSI) as the ionic liquid, may use propylene carbonate (PC) as the carbonate-based solvent, may use acetonitrile (ACN) as the nitrile-based solvent, the at least one electrolyte salt may include a lithium salt and a salt additive, 0.5-1.5 M LiBOB may be used as the lithium salt, and 0.01-0.1 M LiNO$_3$ may be used as the salt additive.

Concretely, an electrolyte according to various exemplary embodiments of the present disclosure may use 1-ethyl-3-methylimidazolium bis(trifluoromethylsulfonyl)imide (EMI-TFSI) as the ionic liquid, may use propylene carbonate (PC) as the carbonate-based solvent, may use acetonitrile (ACN) as the nitrile-based solvent, the at least one electrolyte salt may include a lithium salt and a salt additive, 0.4-1.0 M LiBOB may be used as the lithium salt, and 0.01-0.1 M LiNO$_3$ may be used as the salt additive.

Concretely, an electrolyte according to various exemplary embodiments of the present disclosure may use 1-butyl 1-methylpiperidinium bis(trifluoromethylsulfonyl)imide (P14-TFSI) as the ionic liquid, may use propylene carbonate (PC) as the carbonate-based solvent, may use acetonitrile (ACN) as the nitrile-based solvent, the at least one electrolyte salt may include lithium salts and a salt additive, 0.3-1.0 M LiTFSI and 0.2-0.6 M LiBOB may be used as the lithium salts, and 0.01-0.1 M LiNO$_3$ may be used as the salt additive.

Trials to apply ionic liquids to lithium secondary battery systems are ongoing.

Figure 2A:
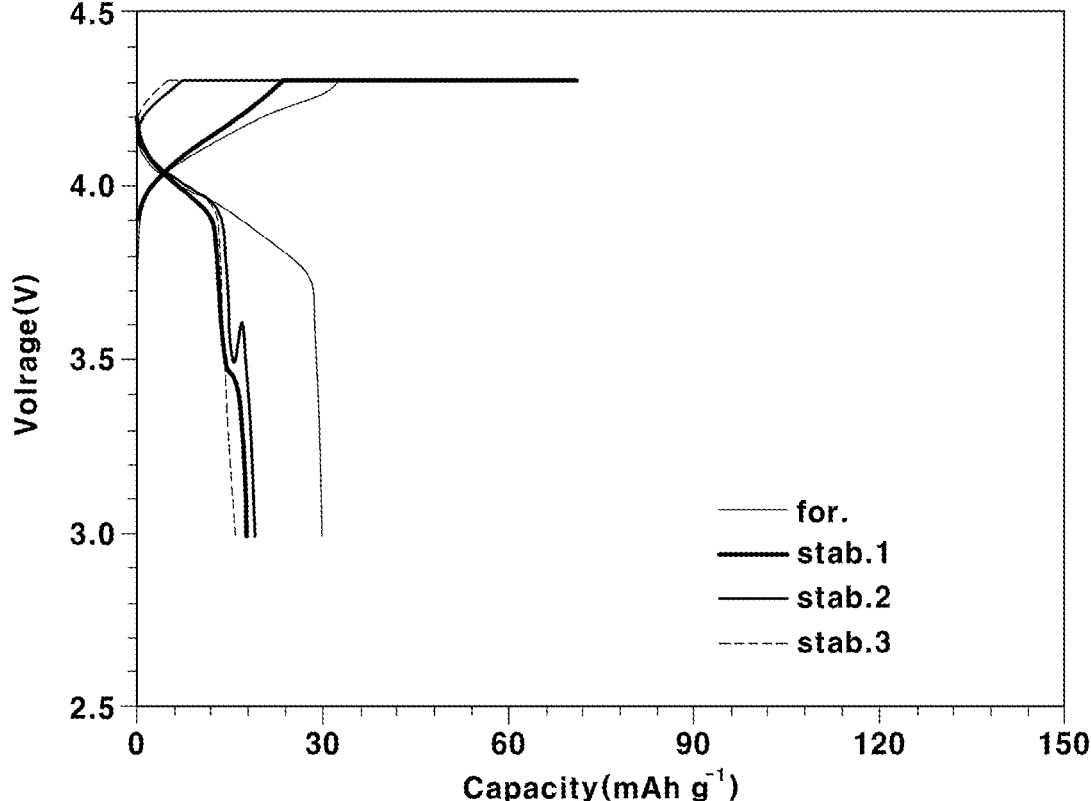
FIG. 2A and FIG. 2B show capacity and voltage changes of an LMO/Li cell using a conventional ionic liquid as a solvent.

FIG. 2A shows results of precycling of an LMO/Li half-cell using an electrolyte, in which 1 M LiTFSI as a salt is dissolved in pure P14-TFSI, which is an ionic liquid, as a solvent, at room temperature.

Here, the test conditions of the half-cell were 0.1 C/0.1 C (0.166 mA) (in the CC mode) in a formation step, and were 0.2 C/0.2 C (0.332 mA) (CC/CV mode charge (0.033 mA), and CC mode discharge) in a stabilization step.

Referring to FIG. 2A, the discharge capacity of the half-cell was measured to be 30 mAh g$^{-1}$ in the initial formation step due to the high ionic conductivity of the ionic liquid, and thus, it may be confirmed that driving of the half-cell is substantially impossible.

Figure 2B:
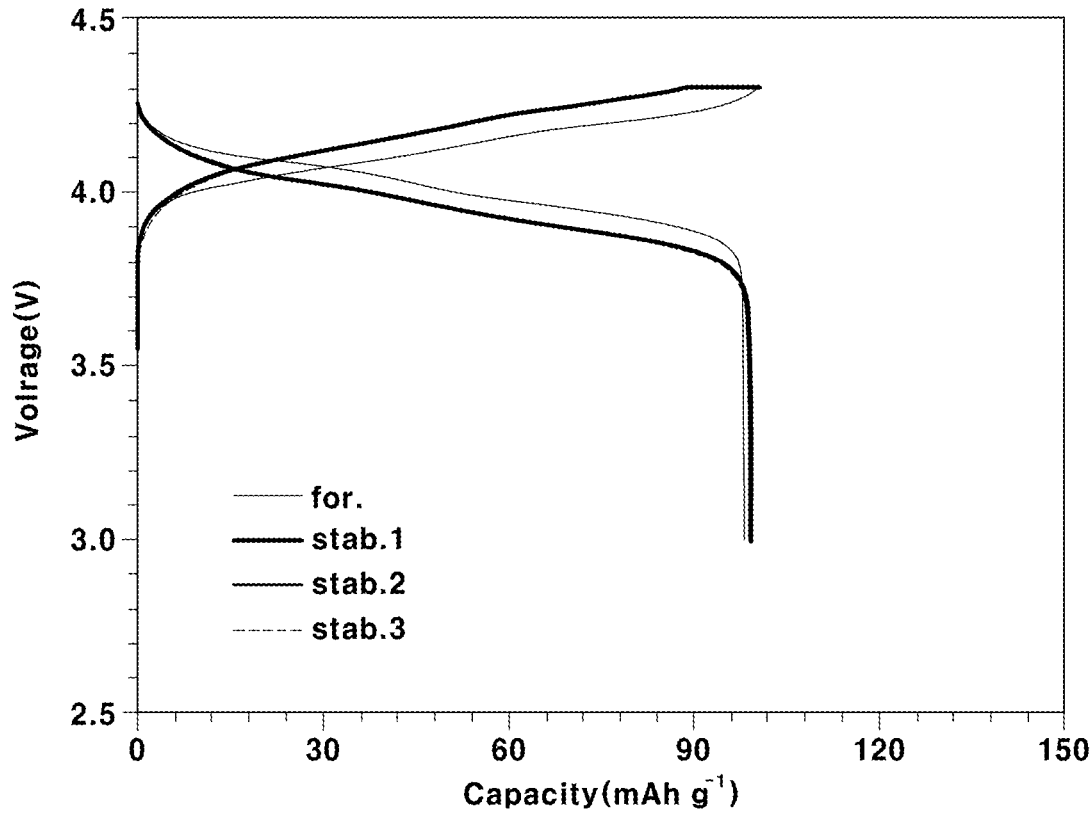
Figure 2C:
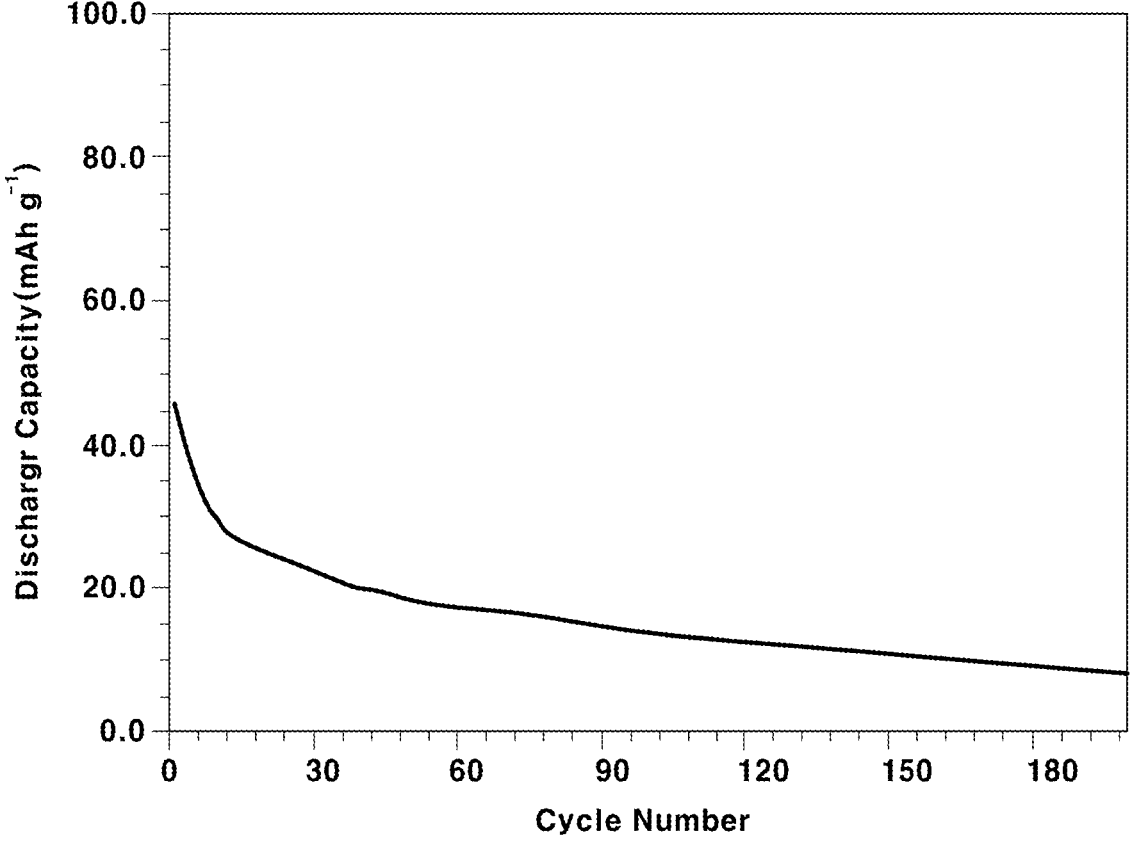
FIG. 2C shows a capacity of the LMO/Li cell using the conventional ionic liquid as the solvent depending on cycle number.

Subsequently, FIGS. 2B and 2C show results of precycling and cycling at 0.5 C of the same half-cell using the ionic liquid electrolyte at a temperature of 60° C.

Referring to FIGS. 2B and 2C, driving of the half-cell was possible in precycling at the temperature of 60° C., but the half-cell exhibited a low discharge capacity and a short lifespan in cycling at 0.5 C and thus it may be confirmed that the half-cell exhibited low performance and was thus difficult to substantially drive.

The electrolyte for lithium secondary batteries according to an exemplary embodiment of the present disclosure has an ionic conductivity of $7.4 \times 10^{-3}$ S/cm or more and an activation energy of $9.9 \times 10^{-5}$ eV or less at a temperature of 25° C.

Hereinafter, the present disclosure will be described in more detail through the following examples. The following examples serve merely to exemplarily describe the present disclosure, and are not intended to limit the scope of the present disclosure.

Test Example 1: Measurement of Ionic Conductivity and Activation Energy

First, in order to confirm characteristics of electrolytes, each of which includes an ionic solvent, cosolvents and at least one electrolyte salt, the ionic conductivities and activation energies of the electrolytes were measured.

EMIM-TFSI, P13-TFSI and P14-TFSI were used as ionic solvents, and a carbonate-based solvent and a nitrile-based solvent were used as the cosolvents.

Lithium salts, such as LiTFSI, LiBOB, LiFSI or LiPF$_6$, may be used as the electrolyte salts, at least one lithium salt may be used, and a functional salt additive, such as LiNO$_3$, may be added.

Figure 3:
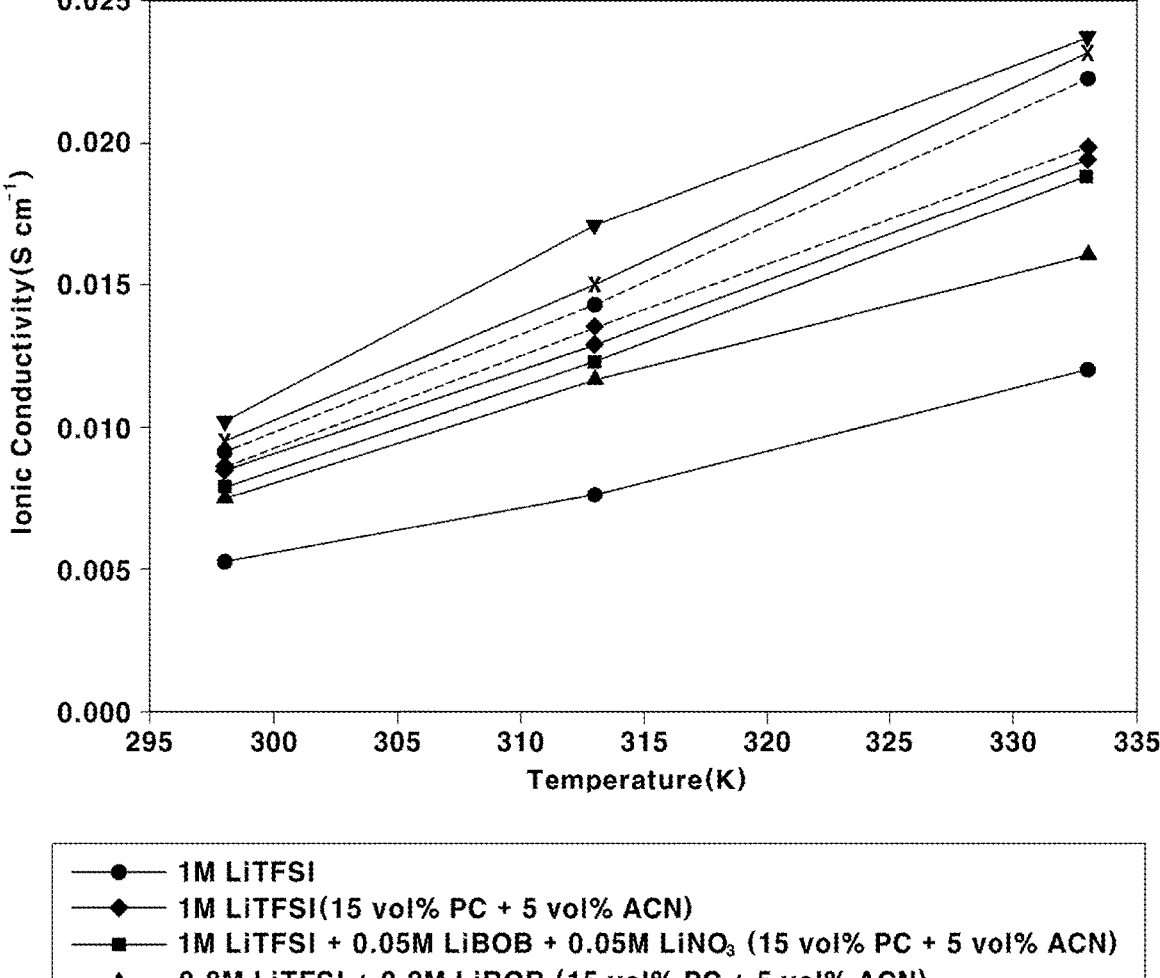
FIG. 3 shows ion conductivities of electrolytes depending on temperature.

After the cosolvents are added to the ionic liquid and two electrolyte salts or at least one salt and a salt additive are injected thereinto, the ionic conductivities of the respective electrolytes were measured depending on temperature, and the measured ionic conductivities are represented in FIG. 3. Furthermore, the ionic conductivities and the active energies of the electrolytes are set forth in Table 1 below.

Here, FIG. 3 shows the ionic conductivities of the electrolytes using the ionic liquid depending on temperature. Table 1 represents result values of the ionic conductivities and the active energies of the electrolytes using the ionic liquid.

TABLE 1

| Ionic Liquid | Dilution | Salt(s) | Ionic Conductivity @25/Scm$^{-1}$ | Activation Energy/eV |
|---|---|---|---|---|
| 1 EMIM-TFSI | | 1M LiTFSI | $5.253 \times 10^{-3}$ | $10.3623 \times 10^{-5}$ |
| 2 EMIM-TFSI | PC 15 vol % ACN 5 vol % | 1M LiTFSI | $8.481 \times 10^{-3}$ | $8.7949 \times 10^{-5}$ |
| 3 EMIM-TFSI | PC 15 vol % ACN 5 vol % | 1M LiTFSI 0.05M LiBOB 0.05M LiNO$_3$ | $7.899 \times 10^{-3}$ | $8.9312 \times 10^{-5}$ |
| 4 EMIM-TFSI | PC 15 vol % ACN 5 vol % | 0.8M LiTFSI 0.2M LiBOB | $7.497 \times 10^{-3}$ | $9.8039 \times 10^{-5}$ |
| 5 EMIM-TFSI | PC 35 vol % ACN 5 vol % | 0.6M LiTFSI 0.4M LiBOB | $9.168 \times 10^{-3}$ | $8.9312 \times 10^{-5}$ |
| 6 EMIM-TFSI | PC 35 vol % ACN 5 vol % | 0.6M LiTFSI 0.4M LiBOB 0.05M LiNO$_3$ | $8.593 \times 10^{-3}$ | $8.7535 \times 10^{-5}$ |
| 7 EMIM-TFSI | PC 45 vol % ACN 5 vol % | 0.6M LiBOB | $10.204 \times 10^{-3}$ | $8.12959 \times 10^{-5}$ |
| 8 EMIM-TFSI | PC 45 vol % ACN 5 vol % | 0.6M LiBOB 0.05M LiNO$_3$ | $9.502 \times 10^{-3}$ | $8.66214 \times 10^{-5}$ |

Referring to FIG. 3 and Table 1, it may be confirmed that the ion conductivities of the electrolytes were greatly increased and the activation energies of the electrolytes were reduced due to addition of the cosolvents, and the electrolytes maintained relatively high ion conductivities even when at least one electrolyte salt was added.

Test Example 2: Lifespan Characteristic Evaluation

Subsequently, unit cells according to Examples 1 to 5, each of which employs an electrolyte using an ionic liquid, cosolvents and at least one electrolyte salt, were manufactured, and the lifespan characteristics of the respective unit cells were evaluated.

Example 1: 20 vol % of Cosolvents, and Electrolyte Salts (Two Lithium Salts)

First, in order to perform lifespan characteristic evaluation, the unit cells were manufactured in the form of a coin cell (CR2032). Here, LMO was used as a cathode, lithium metal was used as an anode, and glass fiber was used as a separator.

Here, in Example 1, the electrolyte prepared by dissolving 0.8 M LiTFSI and 0.2 M LiBOB as the electrolyte salts in a mixed solution obtained by mixing 80 vol % of EMIM-TFSI as the ionic liquid, 15 vol % of propylene carbonate (PC) as the carbonate-based solvent, and 5 vol % of acetonitrile (ACN) as the nitrile solvent was used.

The lifespan of the unit cell in the form of the coin cell according to Example 1 was evaluated under charging conditions of 0.5 C (0.83 mA) (CC (constant current)/CV (constant voltage) mode (0.083 mA)) and discharging conditions of 0.5 C (0.83 mA) (CC mode) at a temperature of 60° C.

Figure 4:
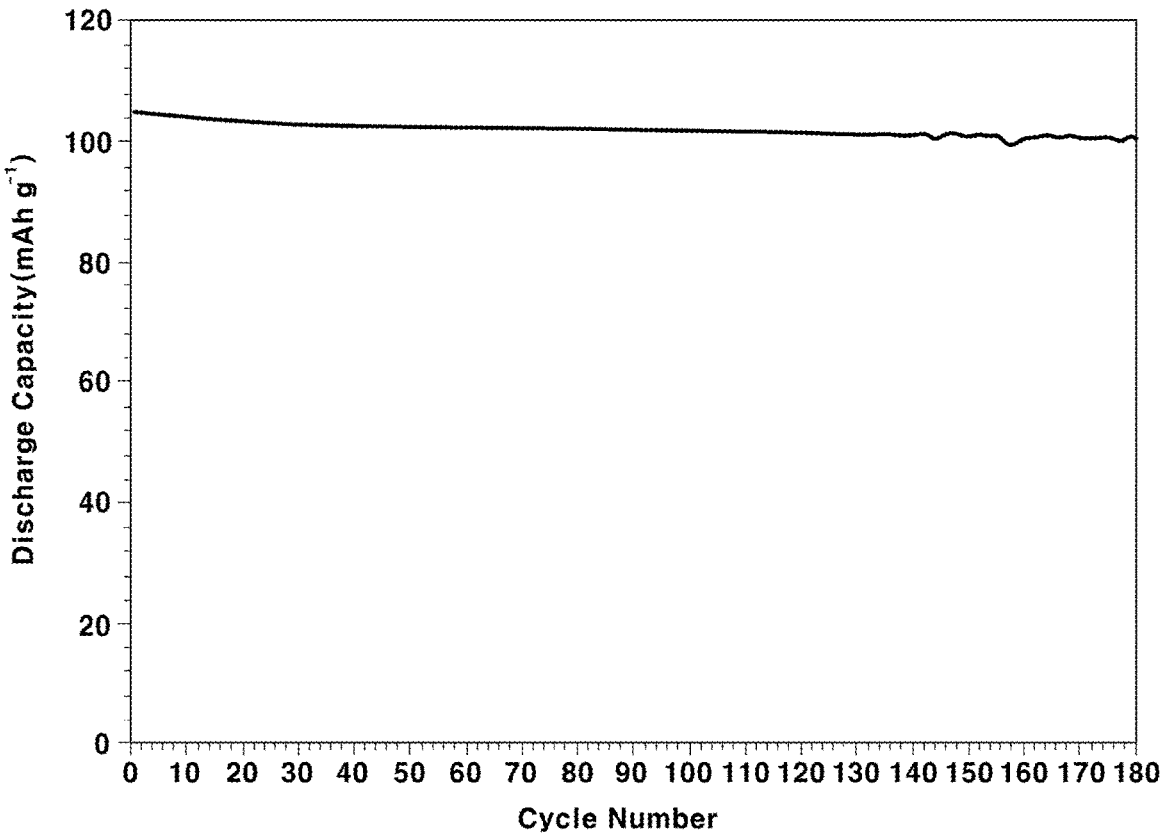
FIG. 4 shows a capacity of a lithium secondary battery manufactured according to Example 1 of the present disclosure depending on cycle number.

Referring to FIG. 4, the unit cell according to Example 1 exhibited a discharge capacity of 100 mAh g$^{-1}$ or more, while the half-cell using the pure ionic liquid exhibited a discharge capacity of 30 mAh g$^{-1}$, as described above. Furthermore, it may be confirmed that the lifespan of the unit cell according to Example 1 was stably retained for 180 cycles. Here, FIG. 4 shows the capacity of a lithium secondary battery manufactured according to Example 1 of the present disclosure depending on cycle number.

Therefore, the ionic liquid-based electrolyte in which 15 vol % of propylene carbonate (PC) configured to improve ionic conductivity and 5 vol % of acetonitrile (ACN) configured to reduce viscosity were added to the ionic liquid was used in Example 1.

Thereby, in Example 1, LiBOB, which was not applied to a pure ionic liquid due to a solubility problem, may be applied as the electrolyte salt through addition of the cosolvents, and the solubility problem was solved. Furthermore, it may be confirmed that the ionic liquid-based electrolyte according to Example 1 may functionally serve as the conventionally well-known dual salt electrolyte.

Example 2: 40 vol % of Cosolvents, and Electrolyte Salts (Two Lithium Salts)

In Example 2, the electrolyte prepared by dissolving 0.6 M LiTFSI and 0.4 M LiBOB as the electrolyte salts in a mixed solution obtained by mixing 60 vol % of EMIM-TFSI as the ionic liquid, 35 vol % of propylene carbonate (PC) as the carbonate-based solvent, and 5 vol % of acetonitrile (ACN) as the nitrile solvent was used. Thereafter, the unit cell in the form of a coin cell was manufactured using the same method and materials as in the above-described Example. The lifespan of the unit cell in the form of the coin cell was evaluated under the same conditions as in Example 1.

Figure 5:
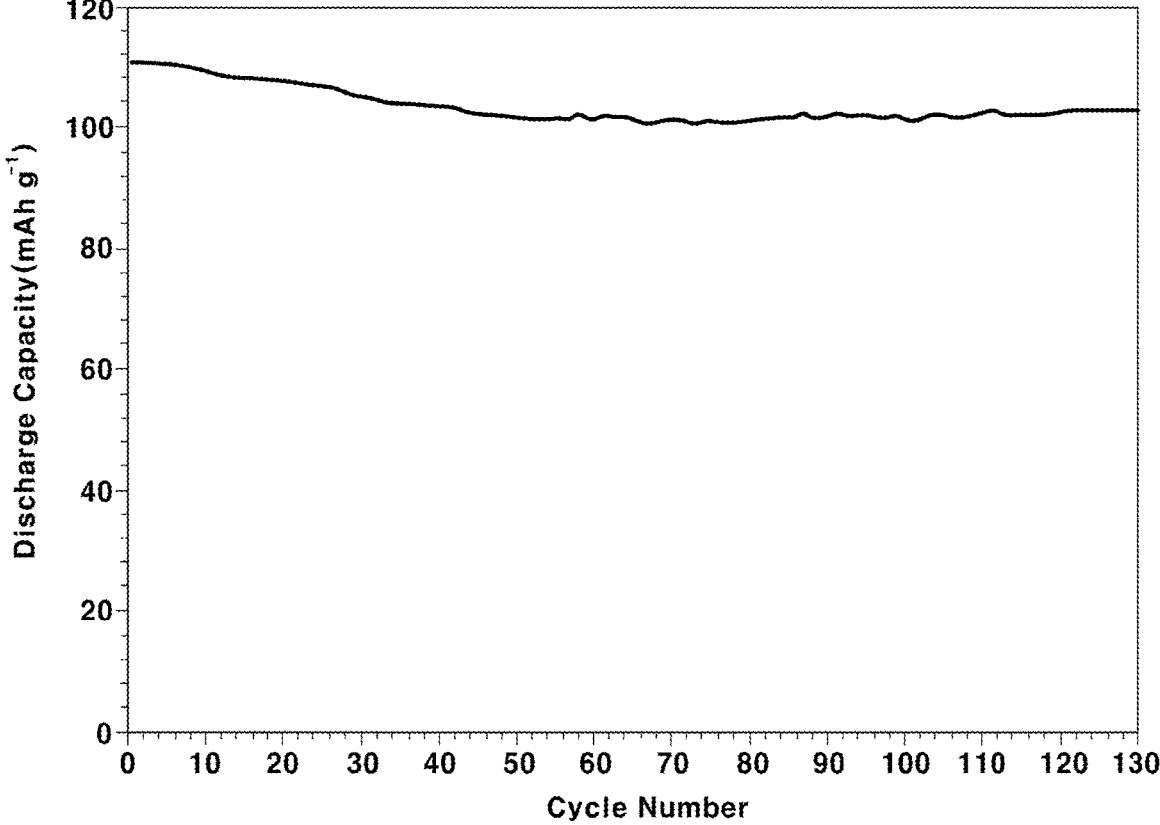
FIG. 5 shows a capacity of a lithium secondary battery manufactured according to Example 2 of the present disclosure depending on cycle number.

Referring to FIG. 5, it may be confirmed that this unit cell exhibited a high discharge capacity and high capacity retention as in Example 1. Here, FIG. 5 shows the capacity of a lithium secondary battery manufactured according to Example 2 of the present disclosure depending on cycle number.

Therefore, it may be confirmed that use of the ionic liquid-based electrolyte in which 35 vol % of propylene carbonate (PC) configured to improve ionic conductivity and 5 vol % of acetonitrile (ACN) configured to reduce viscosity were added to the ionic liquid in Example 2 increased the concentration of the lithium salts, the use of which was limited due to the solubility problem, while increasing the content of the cosolvents.

Example 3: 50 vol % of Cosolvents, and Electrolyte Salt (One Lithium Salt and Salt Additive)

In Example 3, the electrolyte prepared by dissolving 0.6 M LiBOB as the electrolyte salt and 0.05 M LiNO$_3$ as a salt additive in a mixed solution obtained by mixing 50 vol % of EMIM-TFSI as the ionic liquid, 45 vol % of propylene carbonate (PC) as the carbonate-based solvent, and 5 vol % of acetonitrile (ACN) as the nitrile solvent was used. Thereafter, the unit cell in the form of a coin cell was manufactured using the same method and materials as in the above-described Examples. The lifespan of the unit cell in the form of the coin cell was evaluated under the same conditions as in Example 1.

Figure 6:
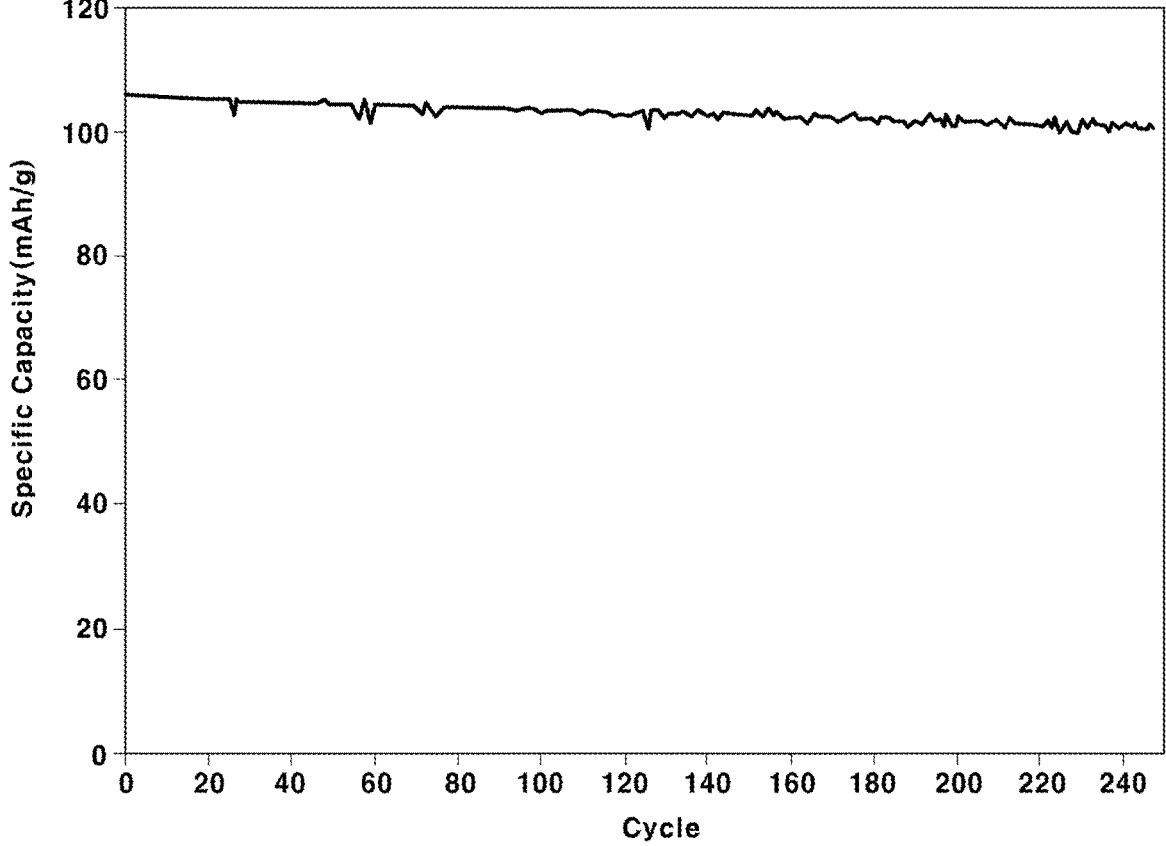
FIG. 6 shows a capacity of a lithium secondary battery manufactured according to Example 3 of the present disclosure depending on cycle number.

Referring to FIG. 6, it may be confirmed that this unit cell exhibited a high discharge capacity and high capacity retention as in Examples 1 and 2. Here, FIG. 6 shows the capacity of a lithium secondary battery manufactured according to Example 3 of the present disclosure depending on cycle number.

Therefore, it may be confirmed that use of the ionic liquid-based electrolyte in which 45 vol % of propylene carbonate (PC) configured to improve ionic conductivity and 5 vol % of acetonitrile (ACN) configured to reduce viscosity were added to the ionic liquid in Example 3 increased the content of the lithium salt and enabled introduction of a functional additive.

Furthermore, it may be confirmed that, even when the content of the cosolvents increased to 50%, the ionic liquid-based electrolyte according to Example 3 maintained non-flammable properties which are properties of the ionic liquid. Furthermore, the ionic liquid-based electrolyte according to Example 3 may have functional advantages of the ionic liquid, such as dual salt effects based on TFSI anions of the ionic liquid and BOB anions of LiBOB.

Example 4: 50 vol % of Cosolvents, Electrolyte Salt (One Lithium Salt and Salt Additive), and Driven at Room Temperature In Example 4, the electrolyte prepared by dissolving 0.6 M LiBOB as the electrolyte salt and 0.05 M $LiNO_3$ as a salt additive in a mixed solution obtained by mixing 50 vol % of EMIM-TFSI as the ionic liquid, 45 vol % of propylene carbonate (PC) as the carbonate-based solvent, and 5 vol % of acetonitrile (ACN) as the nitrile solvent was used. Thereafter, the unit cell in the form of a coin cell was manufactured using the same method and materials as in the above-described Examples.

The lifespan of the unit cell in the form of the coin cell according to Example 4 was evaluated under the same conditions as in Example 1 except that the lifespan of the unit cell was measured at room temperature (25° C.) rather than the temperature of 60° C.

Figure 7:
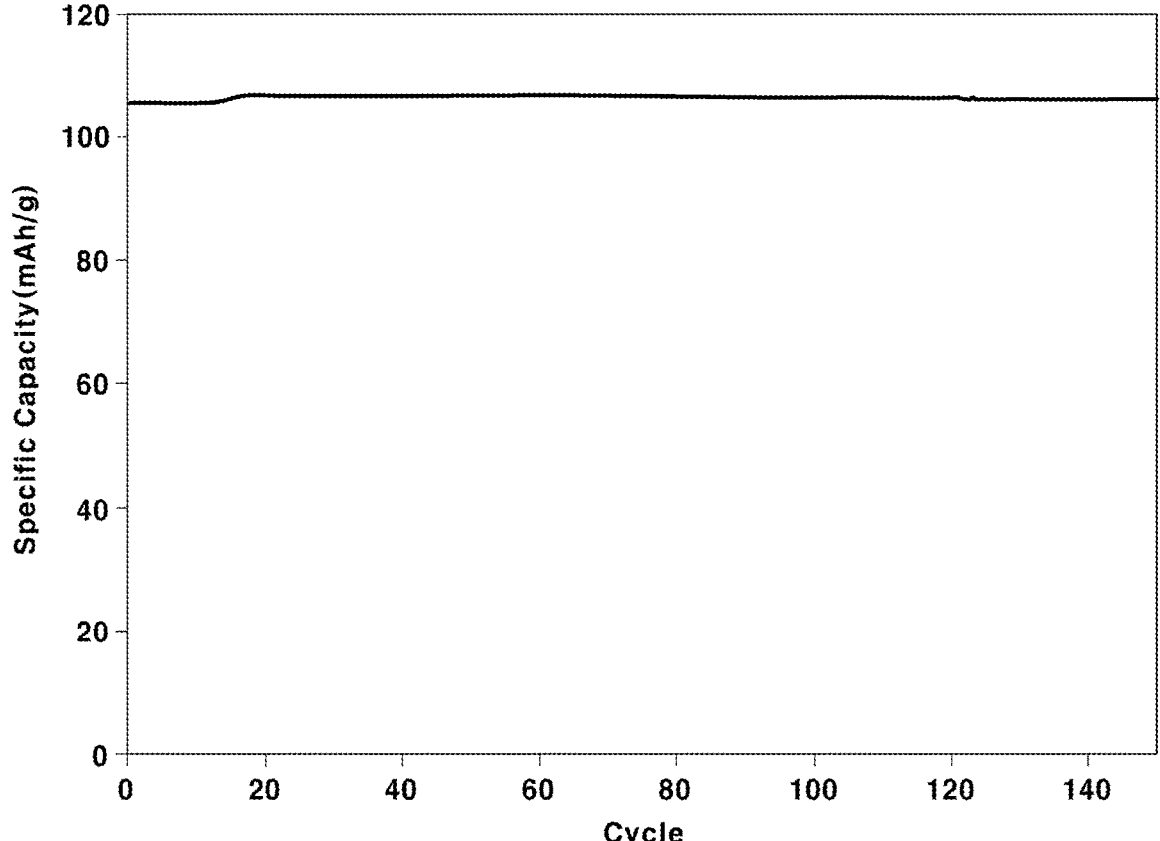
FIG. 7 shows a capacity of a lithium secondary battery manufactured according to Example 4 of the present disclosure depending on cycle number.

Referring to FIG. 7, it may be confirmed that the unit cell according to Example 4 exhibited a high discharge capacity and high capacity retention. Here, FIG. 7 shows the capacity of a lithium secondary battery manufactured according to Example 4 of the present disclosure depending on cycle number.

Therefore, it may be confirmed that use of the ionic liquid-based electrolyte in which 45 vol % of propylene carbonate (PC) configured to improve ionic conductivity and 5 vol % of acetonitrile (ACN) configured to reduce viscosity were added to the ionic liquid in Example 4 enabled driving of the battery and secured performance at room temperature, at which the conventional ionic liquid electrolyte exhibited excessively low performance, due to increase in the ion conductivity and reduction in the viscosity of the ionic liquid-based electrolyte.

Furthermore, it may be confirmed that, the increase in the content of the cosolvents up to 50% increased the content of the lithium salt and enabled introduction of the functional additive, and, even when the content of the cosolvents increased to 50%, the ionic liquid-based electrolyte according to Example 4 maintained non-flammable properties which are properties of the ionic liquid.

Therefore, the lithium secondary battery according to an exemplary embodiment of the present disclosure may maximize the performance of the ionic liquid-based electrolyte and implement a high capacity for 100 cycles or more even at room temperature through addition of the cosolvents.

Furthermore, the ionic liquid-based electrolyte may use the electrolyte salt, which was not conventionally used due to incompatibility with the existing pure ionic liquid, through addition of the cosolvents, thereby being capable of maximizing performance through combinations of various electrolyte salts and salt additives.

Example 5: 50 vol % of Cosolvents, and Electrolyte Salts (Two Lithium Salts and Salt Additive)

First, in order to perform lifespan characteristic evaluation, the unit cell was manufactured in the form of a coin cell (CR2032). Here, LMO (having a loading level of 14) was used as a cathode, lithium metal (having a thickness of 200 μm) was used as an anode, and glass fiber (GF/D, Whatman) was used as a separator.

In Example 5, the electrolyte prepared by dissolving 0.6 M LiTFSI and 0.4 M LiBOB as the electrolyte salts and 0.05 M $LiNO_3$ as a salt additive in a mixed solution obtained by mixing 50 vol % of P14-TFSI as the ionic liquid, 45 vol % of propylene carbonate (PC) as the carbonate-based solvent, and 5 vol % of acetonitrile (ACN) as the nitrile solvent was used. Thereafter, the unit cell in the form of a coin cell was manufactured using the same method and materials as in Example 1.

Comparative Example 1

In Comparative Example 1, an electrolyte prepared by dissolving 1.0 M LiTFSI as an electrolyte salt in EMIM-TFSI as an ionic liquid was used. Thereafter, a unit cell in the form of a coin cell was manufactured using the same method and materials as in Example 5. The lifespan of the unit cell in the form of the coin cell was evaluated under the same conditions as in Example 5.

Figure 8A:
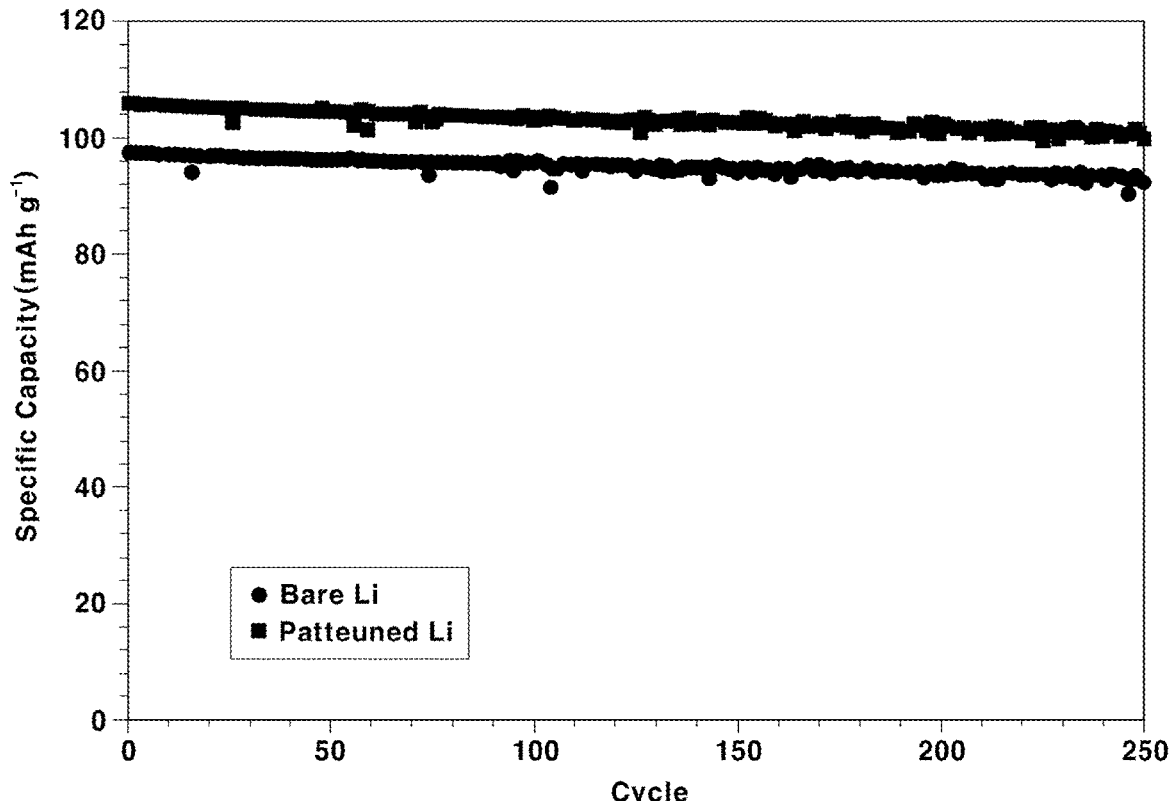
FIG. 8A shows a capacity of a lithium secondary battery manufactured according to Example 5 of the present disclosure depending on cycle number.
Figure 8B:
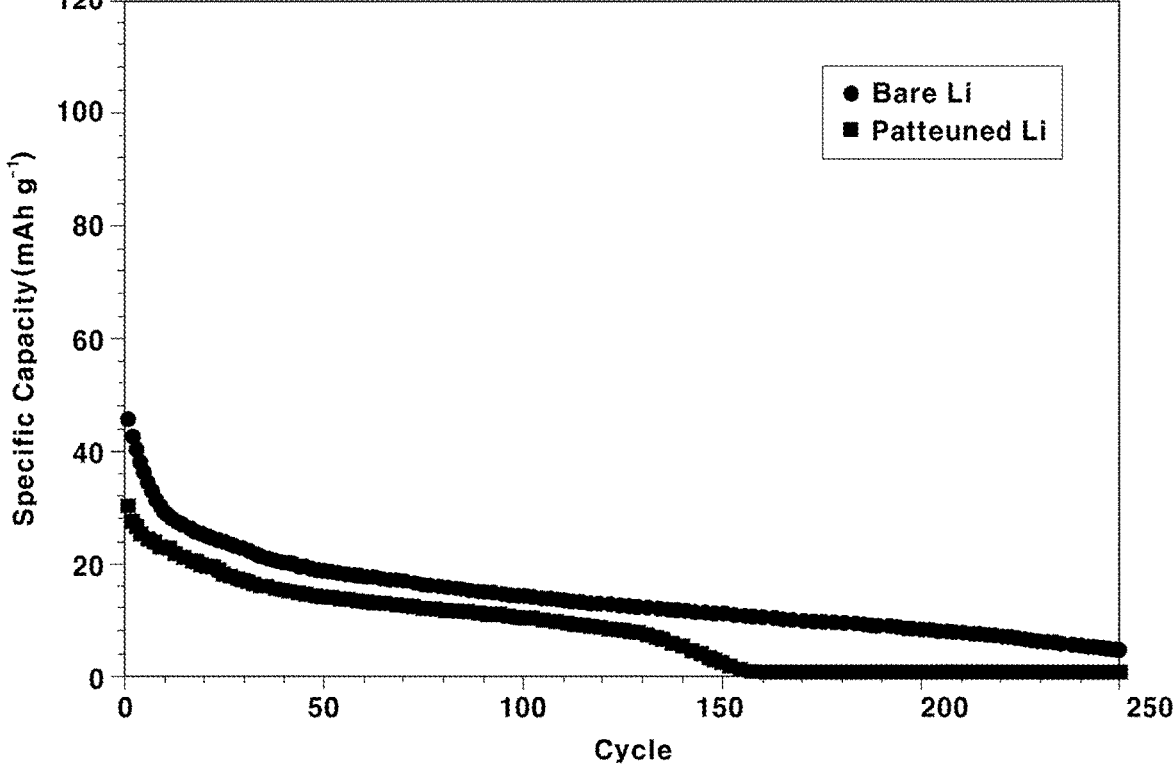
FIG. 8B shows a capacity of a lithium secondary battery manufactured according to Comparative Example 1 depending on cycle number.

FIG. 8A shows a capacity of a lithium secondary battery manufactured according to Example 5 of the present disclosure depending on cycle number, and FIG. 8B shows a capacity of a lithium secondary battery manufactured according to Comparative Example 1 depending on cycle number.

Referring to FIG. 8A, it may be confirmed that the optimized cell was manufactured using the electrolyte in which the ionic liquid, the cosolvents, the two lithium salts and the salt additive are mixed in a proper composition ratio. Here, the lithium secondary battery according to Example 5 in which specific contents of the cosolvents, the two lithium salts and the additives were added to the ionic liquid may implement a high capacity for 250 cycles or more.

On the contrary, referring to FIG. 8B, the lithium secondary battery according to Comparative Example 1 in which any cosolvents were not used and only one electrolyte salt was added to the ionic liquid exhibited a low discharge capacity and a short lifespan in cycling at 0.5 C, and exhibited low performance and was thus difficult to substantially drive.

Therefore, the present disclosure provides an electrolyte using an ionic liquid-based solvent rather than an organic solvent which may satisfy high ion conductivity while having electrochemical stability and non-inflammable properties, thereby being capable of improving output and capacity characteristics and lifespan characteristics of a lithium secondary battery.

As is apparent from the above description, an electrolyte for lithium secondary batteries according to an exemplary embodiment of the present disclosure uses a mixed solvent of an ionic liquid and cosolvents and at least two electrolyte salts through a proper combination, and may thus have electrochemical stability and non-flammable properties while having high ionic conductivity even though an ionic liquid-based solvent is used.

Furthermore, the electrolyte for lithium secondary batteries according to an exemplary embodiment of the present disclosure may solve drawbacks of the ionic liquid, such as high viscosity and low ionic conductivity, through a simple process of mixing the ionic liquid and the cosolvents.

In addition, a lithium secondary battery according to an exemplary embodiment of the present disclosure uses the above-described electrolyte having a high ionic conductivity, thereby being capable of improving output and capacity characteristics and cycle lifespan characteristics.

The foregoing descriptions of specific exemplary embodiments of the present invention have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the present disclosure and their practical application, to enable others skilled in the art to make and utilize various exemplary embodiments of the present invention, as well as various alternatives and modifications thereof. It is intended that the scope of the present disclosure be defined by the Claims appended hereto and their equivalents.

What is claimed is:

1. An electrolyte for a lithium secondary battery, the electrolyte comprising:

a mixed solvent comprising an ionic liquid and a cosolvent; and an electrolyte salt, wherein the cosolvent comprises a carbonate-based solvent and a nitrile-based solvent, wherein the ionic liquid comprises at least one of 1-ethyl-3-methylimidazolium bis(trifluoromethylsulfonyl)imide (EMI-TFSI), 1-methyl-3-propylpiperidinium bis(trifluoromethanesulfonyl)imide (P13-TFSI), 1-butyl 1-methylpiperidinium bis(trifluoromethylsulfonyl) imide (P14-TFSI) or any combination thereof, and wherein the mixed solvent comprises:

an amount of about 50-80 vol % of the ionic liquid;

an amount of about 15-45 vol % of the carbonate-based solvent; and an amount of about 5-10 vol % of the nitrile-based solvent.

2. The electrolyte of claim 1, wherein the mixed solvent comprises the nitrile-based solvent to the carbonate-based solvent in a volume ratio of about 1:3 to 1:9.

3. The electrolyte of claim 1, wherein the carbonate-based solvent includes cyclic carbonate.

4. The electrolyte of claim 1, wherein the carbonate-based solvent comprises propylene carbonate (PC), and the nitrile-based solvent comprises acetonitrile (ACN).

5. The electrolyte of claim 1, wherein the electrolyte salt comprises at least two electrolyte salts.

6. The electrolyte of claim 1, wherein a concentration of the electrolyte salt is about 0.5-1.5 M.

7. The electrolyte of claim 1, wherein the electrolyte salt comprises a lithium salt, and wherein the lithium salt comprises at least two of lithium bis(trifluoromethanesulfonyl)imide (LiTFSI), lithium bis(oxalate) borate (LiBOB), lithium bis(fluorosulfonyl)imide (LiFSI), and lithium hexafluorophosphate (LiPF$_6$).

8. The electrolyte of claim 1, wherein the electrolyte salt comprises a lithium salt and a salt additive, wherein the lithium salt comprises at least one of LiTFSI, LiBOB, LiFSI, LiPF$_6$ or any combination thereof, and wherein the salt additive comprises LiNO$_3$.

9. The electrolyte of claim 8, wherein a concentration of the lithium salt is about 0.5-1.5 M, and a concentration of the salt additive is about 0.01-0.1 M.

10. The electrolyte of claim 1, wherein the ionic liquid comprises 1-ethyl-3-methylimidazolium bis(trifluoromethylsulfonyl)imide (EMI-TFSI), wherein the carbonate-based solvent comprises propylene carbonate (PC), wherein the nitrile-based solvent comprises acetonitrile (ACN), wherein the electrolyte salt comprises a lithium salt, and wherein the lithium salt comprises 0.6-1.0 M LiTFSI and 0.2-0.4 M LiBOB.

11. The electrolyte of claim 1, wherein the ionic liquid comprises 1-ethyl-3-methylimidazolium bis(trifluoromethylsulfonyl)imide (EMI-TFSI), wherein the carbonate-based solvent comprises propylene carbonate (PC), wherein the nitrile-based solvent comprises acetonitrile (ACN), wherein the electrolyte salt comprises a lithium salt and a salt additive, wherein the lithium salt comprises 0.5-1.5 M LiBOB, and wherein the salt additive comprises 0.01-0.1 M LiNO$_3$.

12. The electrolyte of claim 1, wherein the ionic liquid comprises 1-ethyl-3-methylimidazolium bis(trifluoromethylsulfonyl)imide (EMI-TFSI), wherein the carbonate-based solvent comprises propylene carbonate (PC), wherein the nitrile-based solvent comprises acetonitrile (ACN);

wherein the electrolyte salt comprises a lithium salt and a salt additive;

wherein the lithium salt comprises 0.4-1.0 M LiBOB; and wherein the salt additive comprises 0.01-0.1 M LiNO$_3$.

13. The electrolyte of claim 1, wherein the ionic liquid comprises 1-butyl 1-methylpiperidinium bis(trifluoromethylsulfonyl)imide (P14-TFSI), wherein the carbonate-based solvent comprises propylene carbonate (PC), wherein the nitrile-based solvent comprises acetonitrile (ACN), wherein the electrolyte salt comprises a lithium salt and a salt additive, wherein the lithium salt comprises 0.3-1.0 M LiTFSI and 0.2-0.6 M LiBOB, and wherein the salt additive comprises 0.01-0.1 M LiNO$_3$.

14. The electrolyte of claim 1, wherein the electrolyte has an ion conductivity of about $7.4 \times 10^{-3}$ S/cm or more and an activation energy of about $9.9 \times 10^{-5}$ eV or less at a temperature of 25° C.

15. A lithium secondary battery comprising:

a cathode;

an anode comprising lithium metal; and a separator interposed between the cathode and the anode, wherein the lithium secondary battery is impregnated with the electrolyte of claim 1.

* * * * *